Jan. 24, 1961 T. L. GELLER ET AL 2,969,452
ELECTRICALLY HEATED APPARATUS
Filed July 12, 1957 2 Sheets-Sheet 1
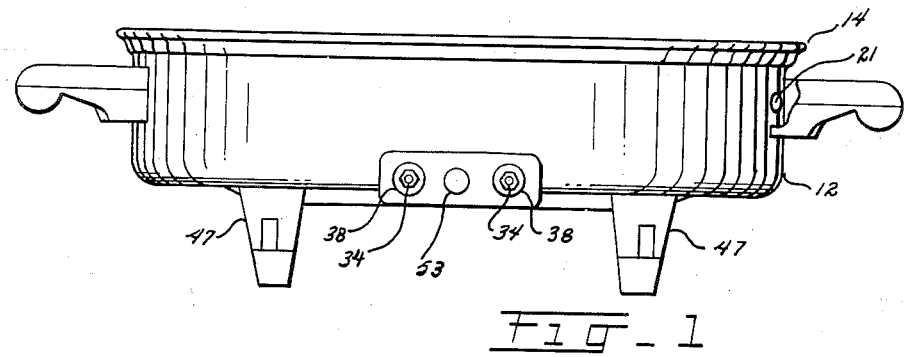
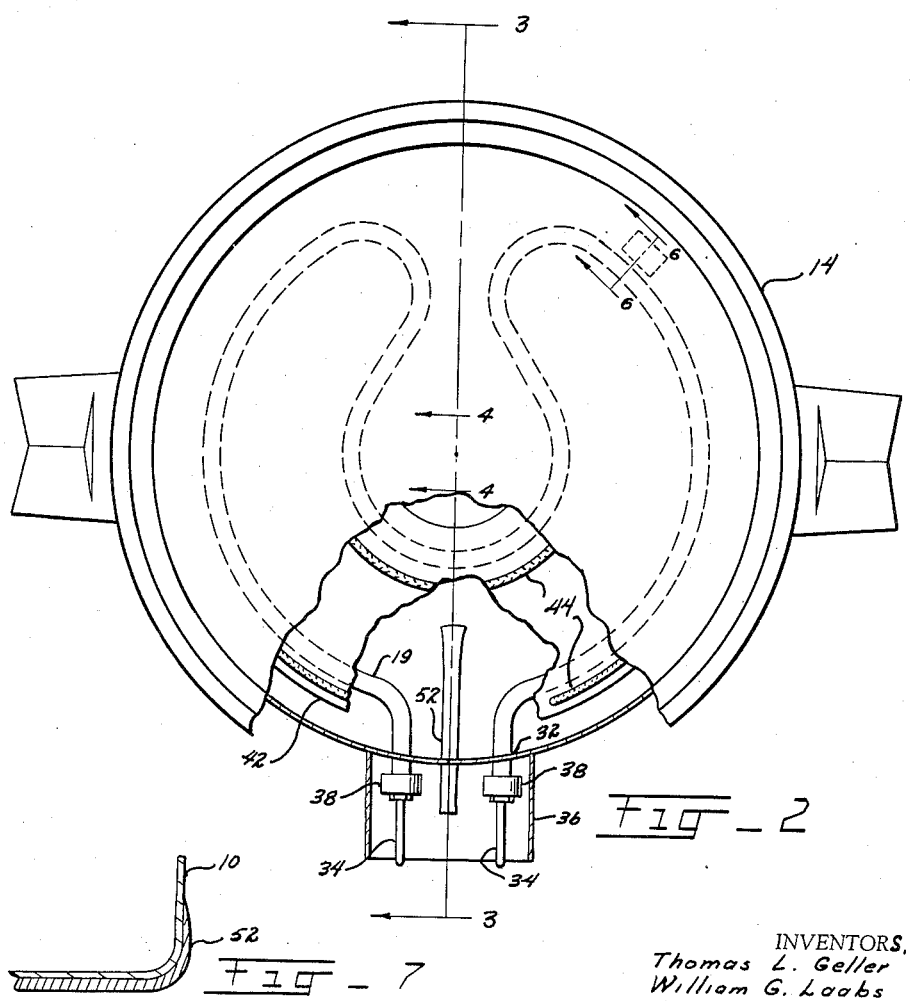
INVENTORS,
Thomas L. Geller
William G. Loobs
Ralph N. Kircher
By John W. Michael Jan. 24, 1961    T. L. GELLER ET AL    2,969,452
ELECTRICALLY HEATED APPARATUS
Filed July 12, 1957    2 Sheets-Sheet 2
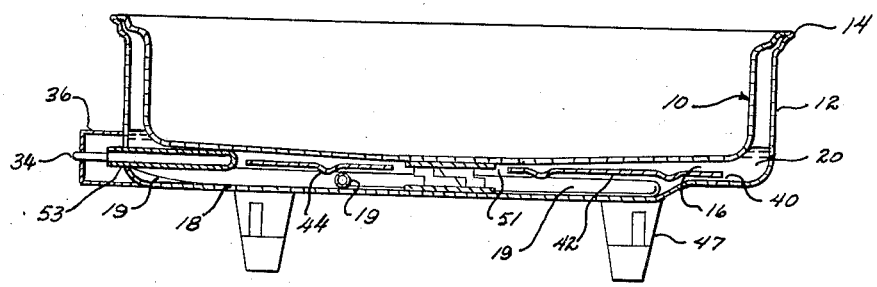
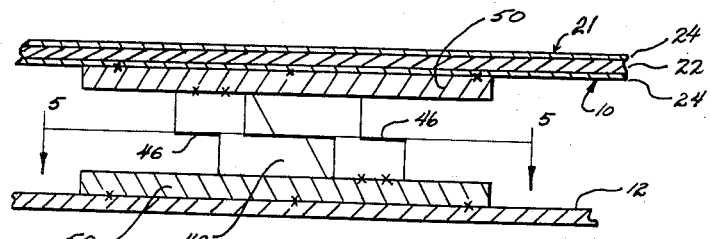
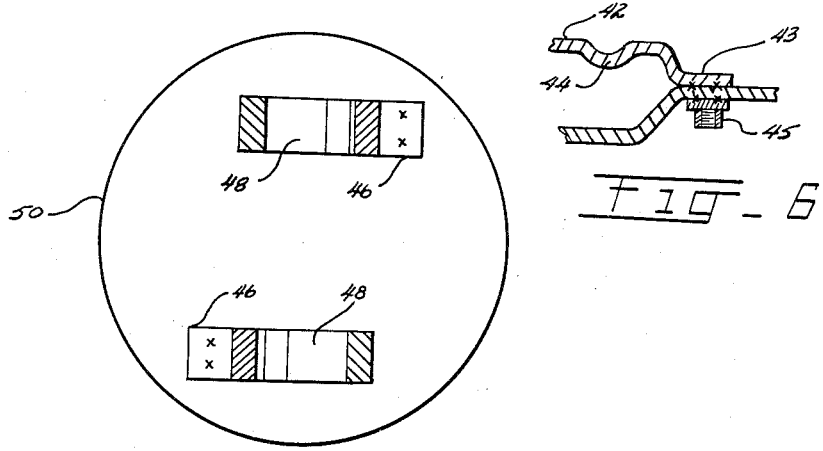
INVENTORS.
Thomas L. Geller
William G. Laabs
Ralph N. Kircher
By John W. Michael

United States Patent Office 2,969,452
Patented Jan. 24, 1961

2,969,452

ELECTRICALLY HEATED APPARATUS

Thomas L. Geller, William G. Laabs, and Ralph N. Kircher, West Bend, Wis., assignors to West Bend Aluminum Co., West Bend, Wis., a corporation of Wisconsin Filed July 12, 1957, Ser. No. 671,451

5 Claims. (Cl. 219—44)

This invention relates to electrically heated apparatus and particularly to improvements in cooking utensils having automatically controlled built-in heating means.

In utensils of this type a sheathed type electric heating element is cast within a rib on the bottom of a cast aluminum vessel because such metal provides a very good heat conductor to obtain distribution of heat throughout the utensil. However, it is desirable that the surfaces of the utensil be non-corrosive, resistant to stain, smooth, and easily cleaned and polished. The built-in heating element must be sealed against entry of water during immersion while washing the utensil. The thermostatic control must be related to the utensil in a manner obtaining most sensitivity to the utensil temperature. When the utensil is made of stainless steel a problem arises in uniformly distributing the heat produced by the electric heating element over the heating surface of the utensil to prevent hot spots and resultant burning of the food being cooked.

It is the primary object of this invention, therefore, to provide electrically heated apparatus in which the heat produced by the built-in electrical heating element will be uniformly and evenly distributed over heating surfaces of stainless steel.

Another object of this invention is to provide a stainless steel cooking utensil with built-in electrical heating element and sensitive temperature control which may be safely immersed in water for washing.

These objects are attained by a two-shell construction forming a hermetically sealed chamber in which oil or other heat transferring fluid is placed with the heating element immersed in such fluid. At least the surface of the shell which is utilized for heating substances placed in contact therewith is made of stainless steel. A thermostat receiving well enters said chamber from the exterior. It is immersed in such fluid and is also in physical contact with the shell having such heating surface. A carbon steel baffle may be positioned between the heating element and such shell to scatter and distribute radiant heat from the element and also direct the flow of the hot fluid to equally distribute the heat to that part of the shell opposite such heating surface. The heat transferring fluid thus transfers heat by conduction and by convection with a mixing action. Both shells may be stainless steel. The one providing the heating surface for substances in contact therewith may consist of a sheet of stainless steel. However, to further improve heat distribution such shell may be made from a layerized sheet consisting of an inner layer of carbon steel and outer layers of stainless steel or it may consist of a sheet of stainless steel having bonded to the chamber side opposite such heating surface a layer of aluminum, copper, or other good heat conductive material.

Accurate automatic thermostatic control of the temperature on the heating surfaces results from having the thermostat receiving well immersed in the heat transferring fluid while also in contact with the shell having the heating surfaces. Being subject to both the anticipatory effect of the temperature of the heat transferring fluid and the temperature of the heating surface, over-running of the desired control temperature will be prevented and accuracy maintained.

Other objects and advantages will be pointed out in, or be apparent from the specification and claims, as will obvious modifications of the embodiments shown in the drawings, in which:

Fig. 1 is a view in side elevation of a frying pan embodying the present invention;

Fig. 2 is a top plan view of the frying pan shown in Fig. 1 with parts of the inner and outer vessels and baffle broken away;

Fig. 3 is a cross sectional view taken along line 3—3 of Fig. 2;

Fig. 4 is an enlarged fragmentary sectional view taken along line 4—4 of Fig. 2 showing the means for holding the bottom portions of the two vessels in spaced relationship, and illustrating a modification using 3-ply sheet for the inner vessel;

Fig. 5 is a sectional view taken along line 5—5 of Fig. 4;

Fig. 6 is an enlarged fragmentary sectional view taken along line 6—6 of Fig. 2 showing how the baffle is mounted and how the legs are attached to the structure; and Fig. 7 is an enlarged fragmentary sectional view of another modification of an inner vessel made of a sheet of stainless steel with a sprayed on layer of aluminum.

Although this invention would find application in many types of electrically heated apparatus wherein it is desired to transmit heat from a surface of stainless steel, it is, for purposes of illustration, shown embodied in a cooking vessel suitable for frying foods and the like.

The electric automatic skillet shown in the drawings comprises two-shell construction having an inner vessel 10 and an outer vessel 12 disposed in spaced concentric relation and hermetically sealed to each other along their upper edges 14 to form a chamber 16 therebetween. The sealed edge 14 between these two vessels may be made in any suitable manner such as by the method described and claimed in the co-pending application Serial No. 605,164, filed August 20, 1956, by Eugene Stuart Eickelberg and Thomas L. Geller.

The outer vessel 12, preferably of stainless steel material, has a depressed portion in its bottom forming a sump 18 beneath the inner vessel 10 for the reception of a heater element 19. Heat transmitting oil 20 is placed in the chamber 16 and enters such sump to insure that the element 19 is completely immersed in such oil. Oil 20 may be a silicone oil or other suitable type which will not break down under normal operating temperatures of up to about 500° F. Such oil must not break down or burn under such normal operating temperatures and should preferably have a life in excess of 5000 hours. An oil which is characterized by a specific heat which increases with temperature is preferable as this decreases the possibility of burning at the higher temperatures. The chamber 16 is charged with the oil 20 through an opening 21 in the wall of outer vessel 12 which is sealed and covered by the one of the handles. The amount of oil is determined by the requirements as to heating the sides of the inner vessel 10. In any event, a suitable expansion space is left for the top of the chamber 16 to prevent distortion during heating.

The inner vessel 10 has an upper surface of stainless steel which is contacted by the substances being cooked. One way of accomplishing this is to employ a sheet of stainless steel as shown in Figs. 1, 2 and 3. However, to further improve heat distribution, a layerized sheet 21, illustrated in Fig. 4, comprising an inner layer 22 of carbon steel and outer layers 24 of stainless steel is used. When the vessel has high sides, such as in sauce pans, economy can be obtained by using a sheet of stainless steel to form the inner vessel 10 as illustrated in Fig. 7 and apply to the bottom and the lower part of the sides a layer 52 of a high heat conductive material such as aluminum or copper. This is sprayed on in a conventional manner. Since the heat distributing layer extends over only a part of the sides, a considerable saving in material is effected. An important feature is that the bottom of the inner vessel 10 is slightly concave downwardly or downwardly dished to prevent an air pocket or dome in which air is trapped beneath the central part of such vessel. This insures positive fluid to metal contact over the entire bottom of the inner vessel.

Heating element 19 is of well known construction and comprises an outer steel tube with a high resistance conductor mounted in the center thereof and spaced from the tube by insulating material. Each heating element 19, see Fig. 2, is curved as shown to form two substantially concentric loops. The ends of the element extend from chamber 16 through spaced openings in the wall of vessel 12 to which the element is sealed by welding 32, brazing, or other suitable means. Prongs 34 are threaded to the outer ends of the resistance of heating element 19 and held within a plug housing 36 attached to the outer vessel. Collars 38 of heat insulating material space such prongs from the steel tubing of such heating element to keep the prongs cool. The sump 18 preferably extends to the periphery of the outer vessel 12 at the housing 36 so that the heating element may reach such periphery without contacting the inner shell 10.

A baffle 42 of carbon steel or other good heat conducting material is mounted in chamber 16 and spaced approximately midway between heating element 19 and the bottom of inner vessel 10. The baffle is fastened to outer vessel 12 by welding four downwardly offset portions 43 on the baffle (Fig. 6) to such outer vessel to provide a space 40 between the peripheral edge of the baffle and the outer vessel except at such four offset portions. Reinforcing ribs 44 in baffle 42 are provided to strengthen the baffle against thermal stresses therein upon heating and cooling thereof. These ribs extend circumferentially along the heating element 19 and are interrupted so as not to transverse such element. As shown in Fig. 6, a female connector 45 for assembling legs 47 is fastened to the bottom of outer vessel 12 at a point opposite offset portions 43. This arrangement makes it possible to spot weld the baffle and the connectors 45 to outer vessel 12 in a single operation.

As the heat transferring oil 20 in the chamber 16 and in sump 18 is heated by the immersed element 19 the hotter oil will rise by convection and circulate upwardly until it reaches baffle 42, which will force the greater part of the hotter oil to flow outwardly through space 40 between the peripheral edge of the baffle and the outer vessel and around the edge of the baffle to carry heat to the outer portion of the inner vessel 10. This convection distribution to the outer portions of inner vessel 10 will equalize that heat transferred to the central portions of the inner vessel by conduction and radiation from the heating element 19 and baffle 42 and that carried by convection through the limited center opening 51 in such baffle. The carbon baffle 42, being a good heat conductor, will also tend to evenly distribute the heat produced by element 19 and transferred to it by radiation, convection, and conduction. The net effect of the heat transfer by conduction, radiation and mixing convection, is to uniformly distribute the heat produced by element 19 over the entire bottom and lower parts of the sides of inner vessel 10. Such distribution accomplished by the heat transfer fluid is practical and efficient. However, by employing the baffle 42 and a heat distributing layer as part of the inner vessel 10, the even distribution may be accomplished at a greater rate of heat transfer thus permitting the use of higher wattage heating elements and quickening the time within which the desired surface temperature is reached without sacrifice of uniform distribution.

The bottom portions of the inner and outer vessels are fixedly held in spaced relationship by two pair of interlocking clips 46 (see Figs. 4 and 5) attached to plates 50 welded to the opposite surfaces of the inner and outer vessels at the center of the bottom portions thereof. These clips extend through a center opening 51 in baffle 42 and have interlocking fingers 48 which restrain the movement of the two vessels toward and away from each other under both pressure and thermal stresses when heated and cooled. To lock the clips the two vessels are placed in concentric relationship and then angularly rotated with respect to each other to engage the fingers. The vessels with the clips engaged are then sealed along their top edges 14 as previously described.

To control the cooking temperatures in the inner vessel 10 a thermostat (not shown), preferably of the probe type, is mounted on the female electrical connector plug and when electrical connection is made such thermostat slides into a tube-like well 53 which extends through the side wall of the outer vessel 12 between prongs 34 and is sealed to the outer vessel by welding, brazing, or other suitable means. The closed end of the well extends into chamber 16 below the level of the oil 20 and is in physical contact with the bottom of inner vessel 10. A portion of baffle 42 is cut out to so accommodate well 53 in the chamber. The well 53 and thus the thermostat will be in heat conduction contact with the inner vessel and likewise with the oil 20 in which immersed. The oil around the well provides an anticipatory effect which prevents the temperature of vessel 10 from overrunning the desired control temperature. The placing of the well and thermostat in contact with the inner vessel gives quick accurate response to the temperature of the cooking surface and the combination makes the skillet sensitive and with maximum accuracy for automatically controlling the cooking temperature.

Although several embodiments of the present invention have been illustrated and described, it will be apparent to those skilled in the art that various changes and modifications may be made therein without departing from the spirit of the invention or from the scope of the appended claims.

We claim:

1. An electric cooking apparatus comprising, an inner vessel having a stainless steel cooking surface and an outer vessel hermetically sealed to each other to provide a chamber therebetween, said outer vessel formed to provide a sump in the bottom thereof, oil in said sump to a level whereby it contacts the bottom of said inner vessel, an electric heating element in said sump to heat said oil and cause it to circulate in said chamber, said heating element lying in a plane substantially parallel with the cooking surface of said inner vessel, a thermostat receiving well in said chamber immersed in said oil and lying next to the bottom of said inner vessel, holding means fixedly interconnecting the central parts of the bottom of said vessels to restrain movement thereof toward and away from each other when heated and cooled, and a baffle of heat conducting material in said chamber between said heating element and said inner vessel to direct the flow of said circulating oil outwardly and to dissipate radiant heat from said element to thereby provide uniform heat distribution over the stainless steel cooking surface of said inner vessel.

2. An electric cooking apparatus comprising, an inner vessel having a stainless steel cooking surface and an outer vessel hermetically sealed to each other to provide a chamber therebetween, said outer vessel formed to provide a sump in the bottom thereof, oil in said sump to a level whereby it contacts the bottom of said inner vessel, an electric heating element in said sump to heat said oil and cause it to circulate in said chamber, a baffle of heat conducting material in said chamber between said heating elements and said inner vessel to direct the flow of said circulating oil outwardly and to dissipate radiant heat from said element to thereby provide uniform heat distribution over the cooking surface of said inner vessel, and a thermostat receiving well in said chamber immersed in said oil and contacting the bottom of said inner vessel.

3. An electric cooking apparatus according to claim 2 in which there are holding means fixedly interconnecting the central parts of the bottom of said vessels to restrain movement thereof toward and away from each other when heated and cooled, said holding means including a pair of interlocking clips in said chamber fastened to said inner and outer vessels at the center of the bottom portions thereof and extending through an opening in said baffle.

4. An electric cooking apparatus comprising, an inner and an outer vessel hermetically sealed to each other to provide a chamber therebetween, the bottoms of said inner and outer vessels being substantially flat and spaced a short distance from each other, oil in the space between the bottoms of the two vessels to a level whereby it contacts the bottom of said inner vessel, an electric heating element immersed in said oil and adapted to heat said oil and cause it to circulate in said space between the vessel bottoms, said heating element supported on the bottom of said outer vessel and lying in a plane substantially parallel with the bottoms of said vessels, a substantially flat baffle of heat conducting material in said space between said heating element and the bottom of said inner vessel, said baffle being immersed in said oil and adapted to direct the flow of said circulating oil upwardly and outwardly around the peripheral edges of said baffle and to dissipate radiant heat from said element, and a thermostat receiving well projecting into the space between the bottoms of said vessels, said well being immersed in said oil and having a portion thereof lying above the level of said baffle in close proximity to the bottom of said inner vessel.

5. An electric cooking apparatus comprising, an inner and an outer vessel hermetically sealed to each other to provide a chamber therebetween, the bottoms of said inner and outer vessels being substantially flat and spaced a short distance from each other, oil in the space between the bottoms of the two vessels to a level whereby it contacts the bottom of said inner vessel, an electric heating element immersed in said oil and adapted to heat said oil and cause it to circulate in said space between the vessel bottoms, said heating element supported on the bottom of said outer vessel and being curved to form a plurality of loops lying in a plane substantially parallel with the bottoms of said vessels, and a thermostat receiving well projecting into the space between the bottoms of said vessels, said well being immersed in said oil and positioned in close proximity to the bottom of said inner vessel.

References Cited in the file of this patent
UNITED STATES PATENTS

| | | |
|---|---|---|
| 1,047,418 | Kercher | Dec. 17, 1912 |
| 1,493,459 | Jancikin | May 6, 1924 |
| 2,236,837 | Rimmel | Apr. 1, 1941 |
| 2,279,000 | Larson | Apr. 7, 1942 |
| 2,430,715 | Grayson | Nov. 11, 1947 |
| 2,523,332 | Riehl | Sept. 26, 1950 |
| 2,641,581 | Da Fano | June 9, 1953 |
| 2,653,117 | Keene | Sept. 22, 1953 |
| 2,702,334 | Kleist | Feb. 15, 1955 |
| 2,708,436 | Foster | May 17, 1955 |
| 2,730,608 | Axelsson | Jan. 10, 1956 |
| 2,834,736 | Kaufman | May 13, 1958 |

FOREIGN PATENTS

| | | |
|---|---|---|
| 82,814 | Austria | Feb. 25, 1921 |
| 319,391 | Great Britain | Sept. 19, 1929 |
| 638,519 | Great Britain | June 7, 1950 |
| 204,091 | Australia | Sept. 20, 1956 |